Nov. 2, 1965     S. T. CARTER     3,215,255
HOLD-DOWN APPARATUS FOR LABELING MACHINES
Filed Jan. 21, 1963     7 Sheets-Sheet 1
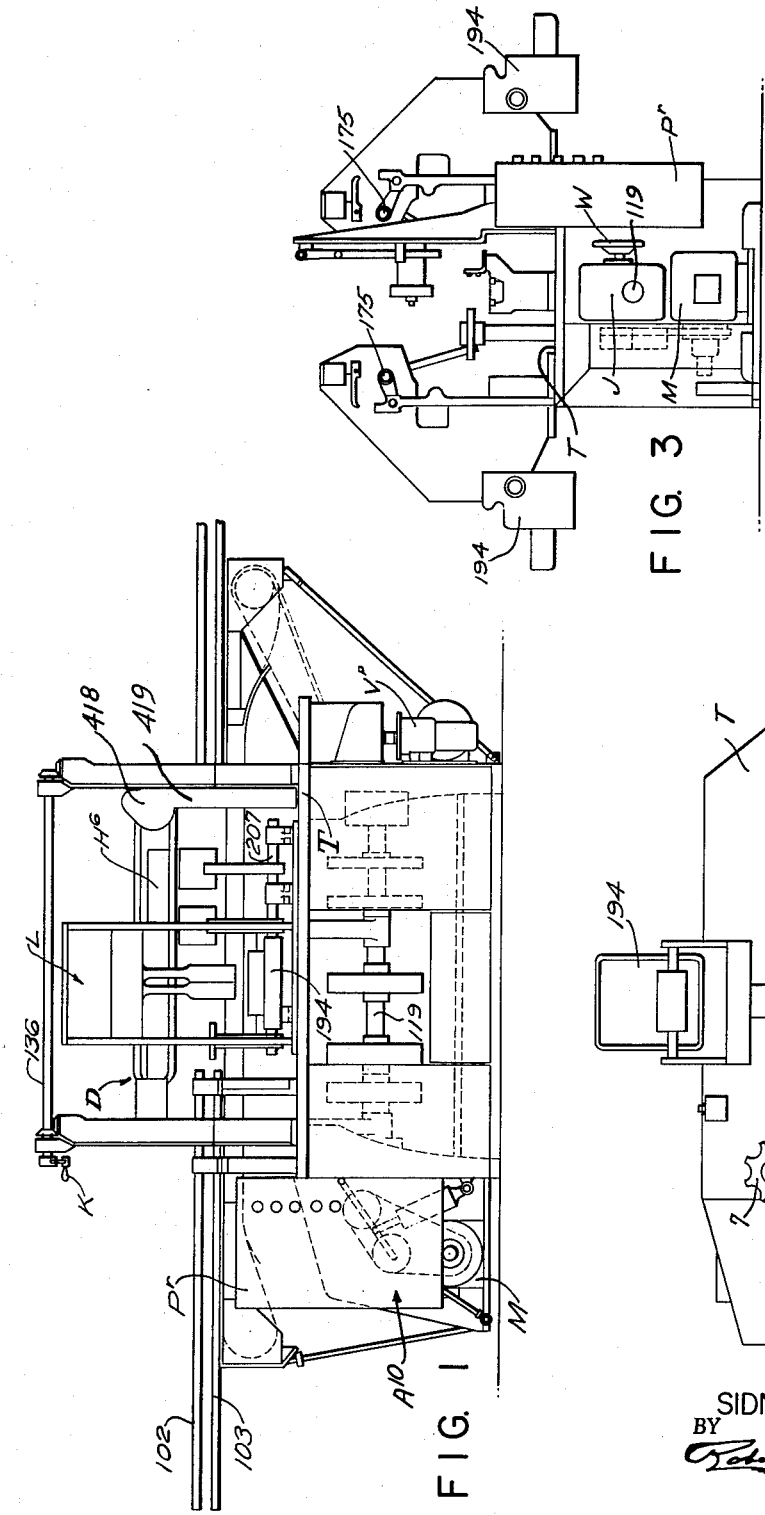
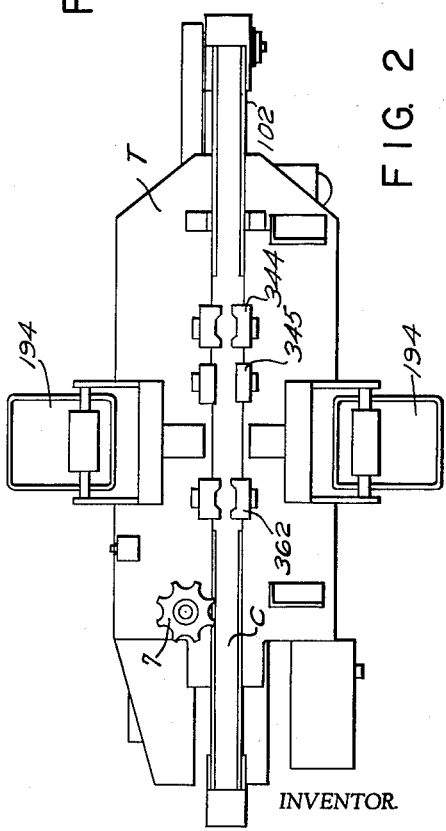
INVENTOR.
SIDNEY T. CARTER
BY
ATT'YS

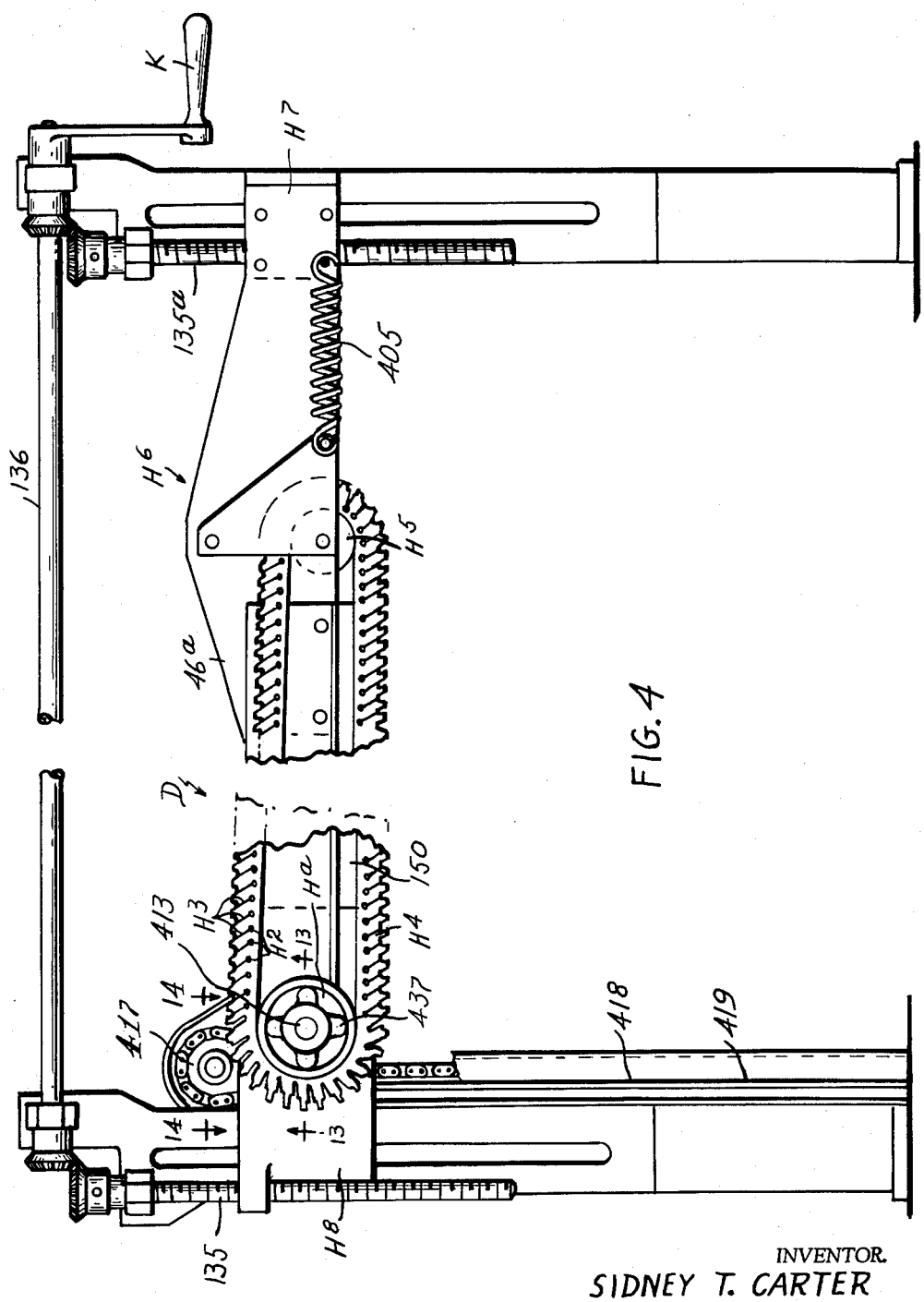

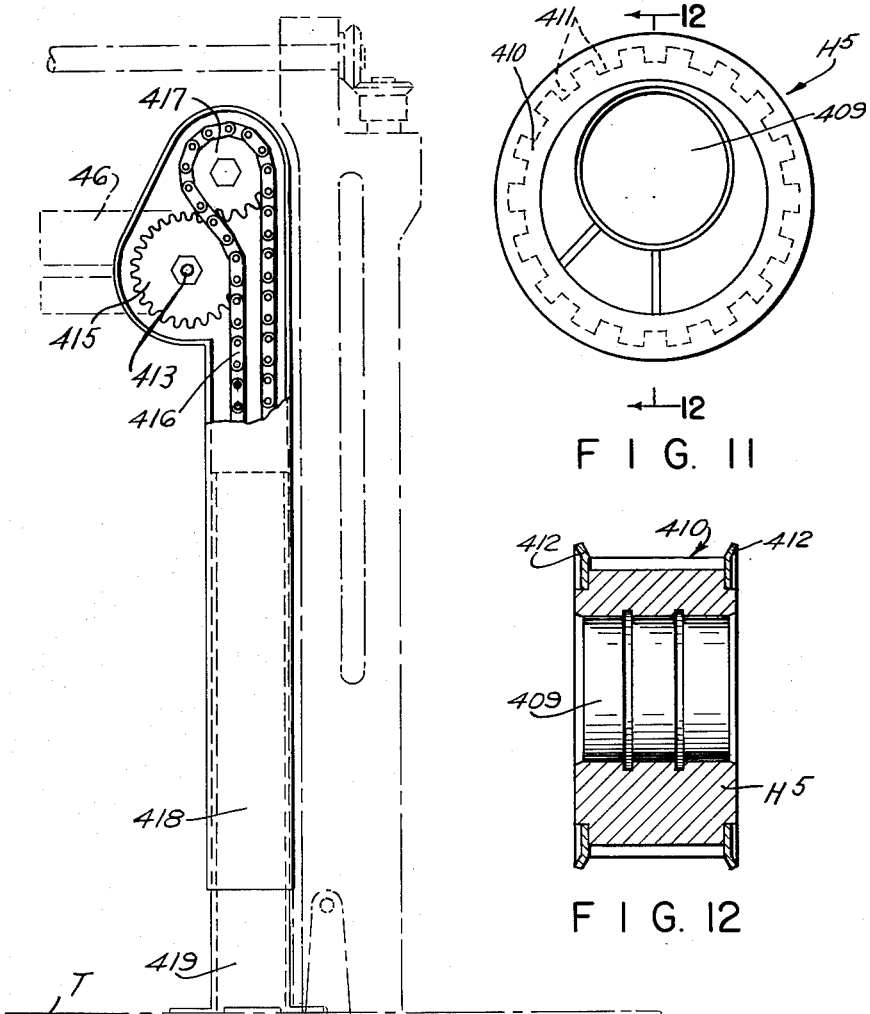

Nov. 2, 1965  S. T. CARTER  3,215,255
HOLD-DOWN APPARATUS FOR LABELING MACHINES
Filed Jan. 21, 1963  7 Sheets-Sheet 4

INVENTOR.
SIDNEY T. CARTER
BY
ATT'YS

Nov. 2, 1965 S. T. CARTER 3,215,255
HOLD-DOWN APPARATUS FOR LABELING MACHINES
Filed Jan. 21, 1963 7 Sheets-Sheet 5

INVENTOR.
SIDNEY T. CARTER
BY
ATT'YS

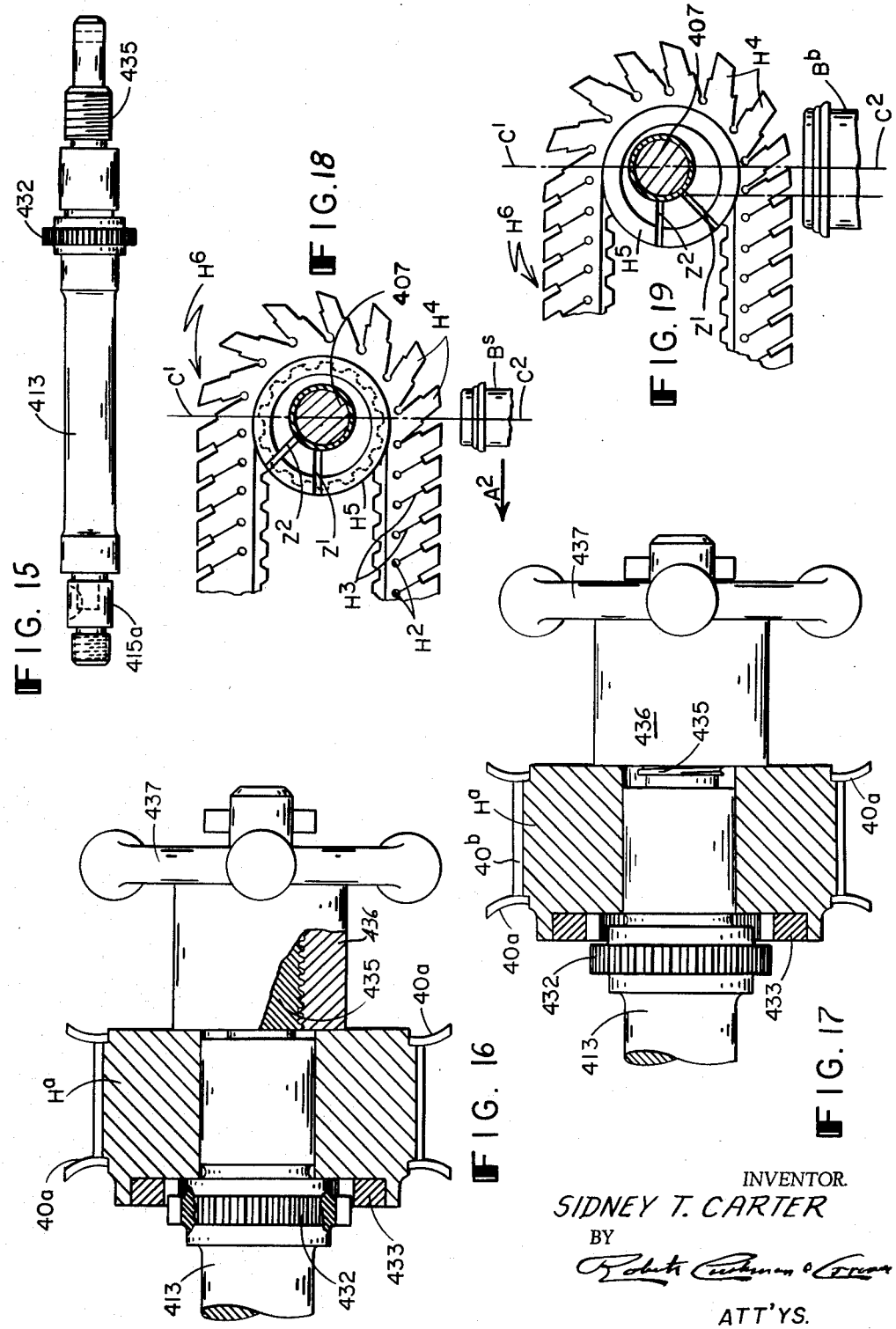

United States Patent Office 3,215,255
Patented Nov. 2, 1965

3,215,255
HOLD-DOWN APPARATUS FOR
LABELING MACHINES
Sidney T. Carter, Shrewsbury, Mass., assignor to Geo. J.
Meyer Manufacturing Co., Cudahy, Wis., a corporation
of Wisconsin
Filed Jan. 21, 1963, Ser. No. 252,638
5 Claims. (Cl. 198—165)

This invention pertains to labeling machines of the straight-away type wherein articles to be labeled, for example bottles, are accurately spaced apart and moved along a rectilinear path through a label-applying zone by a conveyor, and wherein, in order to prevent tipping or undesired orientation of the article about a vertical axis, a so-called "head grip" or "hold-down" is provided, designed to apply downward pressure to the articles such as to clamp it to the conveyor—the present invention relating more especially to an improved hold-down device of the kind which comprises an endless belt which moves in accurately timed relation to the conveyor.

In Patent No. 2,940,630, dated June 14, 1960, to Carter, a hold-down of this general type is disclosed, consisting of an endless belt, comprising a series of resilient, article-contacting blocks, which passes about a drive pulley and about an idler pulley, so supported by a rigid frame, that the lower run of the belt is disposed above and parallel to the path along which the articles travel. Provision is made for adjusting the supporting frame vertically thereby operatively to position said lower run of the belt for contact with bottles of different heights.

In machines of this general type appropriate means, for example a constantly turning helix or helices, is provided for spacing successive articles accurately as they are delivered into the field of action of the hold-down belt. As the hold-down belt moves downwardly about the sprocket in approaching the top of an article moving at conveyor speed, the outer surface of the belt, by reason of its thickness, may travel at a surface speed slightly greater than that of the pitch line of the sprocket and thus somewhat in excess of the conveyor speed, and to minimize this effect the axis of the sprocket has heretofore been so located that, in leaving the sprocket, the belt forms a substantially straight, downwardly inclined run before it is constrained to move exactly horizontally as it comes into contact with the article. However, the inclined run still exerts some horizontal component of force at the instant the belt contacts the article.

In order that the belt may perform its intended function, it is necessary to adjust the hold-down belt very accurately with reference to the driving connections between it and the drive for the conveyor, to insure proper contact of the blocks of the belt with the spaced articles. However, as a concomitant to the vertical adjustment of the frame which supports the hold-down belt, a slight angular turning of the drive sprocket for the belt is occasioned, thus requiring that the article-contacting lower run of the hold-down belt be advanced or retarded slightly, as above referred to, with reference to the conveyor.

Such adjustment has customarily required the disengagement of the belt from the drive sprocket and its repositioning so as to position its lower run accurately with reference to the conveyor. This has been a troublesome operation since the hold-down belt is of substantial length, heavy and diffcult to handle.

The present invention has for an object the provision of means whereby the hold-down belt may be brought into contact with the article without any tendency to tip the article and which is of simple construction and acts without setting up undesirable vibrations, even when operating at high speed.

Another object of the present invention is to provide novel means whereby the drive sprocket for the hold-down belt may be readily adjusted with reference to the shaft upon which it is mounted without requiring that the hold-down belt be disengaged from the sprocket, thus greatly simplifying and facilitating the adjustment of the hold-down device for use with bottles of different heights.

Other objects and advantages of the invention will be pointed out in the following more detailed description and by reference to the accompanying drawings wherein:

FIG. 1 is a diagrammatic front elevation illustrating a labeling machine of the type in which the hold-down device of the present invention is useful;

FIG. 2 is a digrammatic plan view of the machine of FIG. 1;

FIG. 3 is an elevation view from the left-hand side of FIG 1;

FIG. 4 is a fragmentary rear elevation, to much larger scale and omitting many parts, showing the upper mid-portion of the labeling machine of FIG. 1 (which is of the general type of that illustrated in the above patent to Carter, 2,940,630) and, in particular, showing novel means for supporting and adjusting the hold-down belt;

FIG. 5 is a fragmentary front elevation with certain parts in broken lines, to somewhat larger scale than FIG. 4, illustrating driving connections such as to make possible the vertical adjustment of the belt-supporting means without interfering with the drive of the hold-down belt;

FIG. 11 is a face view of the support for the eccentric idler sprocket or pulley of FIG. 10a, removed from its bearings;

FIG. 12 is a diametrical section through the idler sprocket or pulley;

FIG. 15 is a side elevation of the shaft on which the drive sprocket or pulley for the hold-down belt is mounted;

FIG. 16 is a fragmentary, diametrical section through the drive sprocket or pulley, showing the latter clutched to its shaft;

FIG. 17 is a view similar to FIG. 16, but showing the drive sprocket or pulley unclutched from its shaft;

FIG. 18 is a fragmentary, diametrical elevation showing the guide sprocket or pulley for the hold-down belt adjusted relatively to the belt-driving shaft for cooperation with bottles of relatively small diameter; and FIG. 19 is a view similar to FIG. 18, but showing the guide sprocket or pulley adjusted for cooperation with bottles of relatively large diameter.

Figure 6:
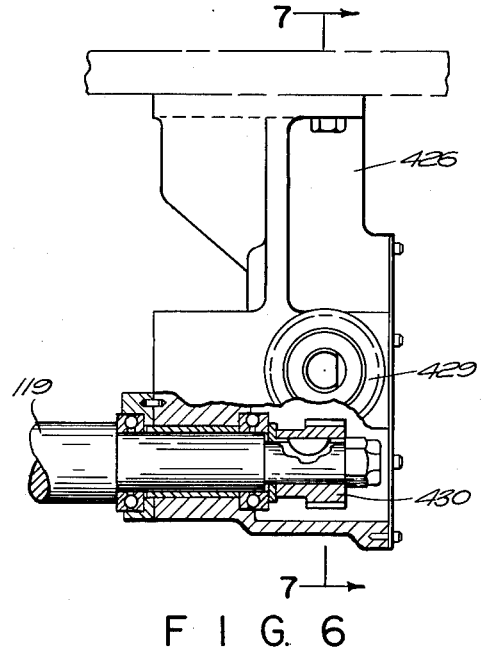
FIG. 6 is a fragmentary vertical section showing one end of the main drive shaft of the machine and the gear fixed thereto, by means of which the hold-down belt and conveyor are driven.

As above pointed out, the hold-down device of the present invention is designed for use in a machine of the general type of that more fully described in the patent to Carter, No. 2,940,630, dated June 14, 1960, and in FIGS. 1, 2 and 3 of the present drawings, parts corresponding in function to those of the patented machine are indicated by the same reference characters. Thus, the machine here illustrated is shown as having a frame which supports a horizontal table T beneath which the motor M, the main drive shaft 119 and most of the motion-transmitting connections are located. The drive shaft 119 turns through an angle of 360° for each cycle of operation—that is to say, during that sequence of motions of the essential label-applying devices which includes the application of glue to a picker, removal of a label from a magazine by a picker, the adhering of a label to the article, and the wiping of the label by appropriate wipers. Interposed between the motor and the main drive shaft 119 (FIG. 3) is a speed-reducing mechanism J, including provision for adjusting the maximum speed manually by means of a hand wheel W. As shown in FIG. 1, the machine here illustrated comprises an automatic speed-control device $A^{10}$ which may, for example, be such as is more fully described in the copending application of Sidney T. Carter, Serial No. 214,883, filed August 6, 1962. As disclosed in the aforesaid patent, No. 2,940,630, the machine makes use of an electric circuit (not here shown) for coordinating its various functions, and has a control panel *pr* which supports manually actuatable switches as well as other elements of the electrical control system.

The machine, as here shown, is designed to apply labels simultaneously to opposite sides of an article as the latter is advanced uninterruptedly along a rectilinear path between the customary guard rails 102, 103, through the label-applying zone L by an endless conveyor C (FIG. 2), the present machine being provided with a power-driven star wheel 7, for example, such as is more fully described in the patent to Carter, No. 2,638,202, dated May 12, 1953, by means of which the articles, as they are advanced by the conveyor, are uniformly spaced apart before entering the labeling zone. It will be understood that other equivalent means for spacing the articles may be substituted for the star wheel, for example a rotating helix such as that indicated by the numeral 153 in the aforesaid patent to Carter, No. 2,940,630. As in the machine of the above patent, the machine herein described is provided with gum-supplying boxes 194, with associated means for raising the gum for presentation to the pickers, and has parallel rock shafts 175 (FIG. 3) for actuating pickers at opposite sides of the machine and with rock shafts 207 (FIG. 1) for the actuation of bottle-straightening means 362 (FIG. 2) and pressure-type wipers 345 and 344 which act successively in pressing a label which has been affixed to the bottle—it being understood that in the labeling zone the labels will be taken by suction-type grip-fingers of conventional type (not here shown) connected by suitable flexible conduits with a vacuum pump V*p* (FIG. 1).

As in the arrangement of Patent No. 2,940,630, the machine comprises a hold-down device D (FIG. 1) operative to apply pressure to the tops of the advancing bottles, after they have passed the straightening device 362, in order to prevent them from turning inadvertently on their way to the labeling zone. This hold-down device, as here illustrated, comprises an endless belt, as more fully described in the aforesaid patent, No. 2,940,630, comprising a flexible base portion, for example of canvas or rubberized fabric, desirably a so-called "Gilmer Timer Belt," which has teeth molded on its inner surface to provide for positive drive, similar to that of a sprocket chain. To the outer surface of this flexible base, that is to say, the side opposite the toothed surface of the belt, there is attached a layer of soft rubber, for example one inch in thickness, this rubber providing a resiliently yieldable cushion for contact with the tops of the articles to be labeled. In order that this thick belt may have the requisite flexibility to enable it to move freely about the supporting and guiding pulleys, the rubber layer is provided (FIGS. 4 and 18) at regular intervals, for example at a distance of three-quarters of an inch apart, with a series of holes $H^2$ extending transversely through the thickness of the rubber layer. Slits $H^3$ extend inwardly from the outer surface of the rubber layer to each of these holes, thus dividing the rubber layer into substantially rectangular blocks $H^4$ (FIGS. 4 and 19).

At its right-hand end, as viewed in FIG. 4, that is to say, that end which is adjacent to the point at which the articles are delivered by the feeding means into the receiving end of the article path, the belt passes about an idler sprocket or guide pulley $H^5$ and at its left-hand end, which is located beyond the labeling station L (FIG. 1) in the direction of travel of the article, the belt H passes about a drive sprocket or pulley H*a* (FIG. 4).

An elongate rigid frame $H^6$ (FIGS. 1, 4, 8 and 9) is supported at its opposite ends by parts $H^7$ and $H^8$, respectively, (FIG. 4), which are vertically adjustable simultaneously by means of parallel, rotatable screw-threaded shafts 135 and 135*a* respectively. These shafts are provided with gears which mesh with gears fixed to a rotary shaft 136 having a crank handle K at one end. By turning the crank the frame may be adjusted vertically while remaining horizontal in all positions of adjustment. Such adjustment is desirable in order that the hold-down belt may be made to cooperate with bottles of different heights. Suitable clamping means (not here shown) is provided for securely holding the frame in adjusted position. A rigid guide shoe 150 (FIG. 4) is carried by the frame and, by contact with the lower run of the belt, keeps the major portion of the length of the latter horizontal and parallel to the conveyor. As indicated in dotted lines at 150*x* (FIG. 8), that end of the guide shoe 150 which is the nearer to the guide sprocket H5 is beveled or sloped upwardly toward the guide sprocket.

Figure 9:
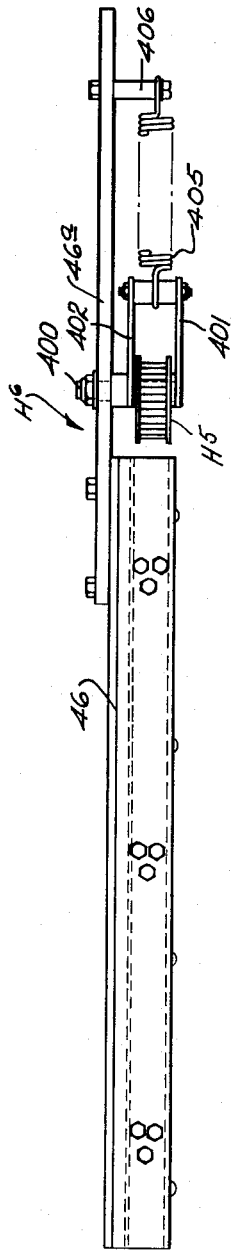
FIG. 9 is a plan view of the frame shown in FIG. 8.
Figure 8:
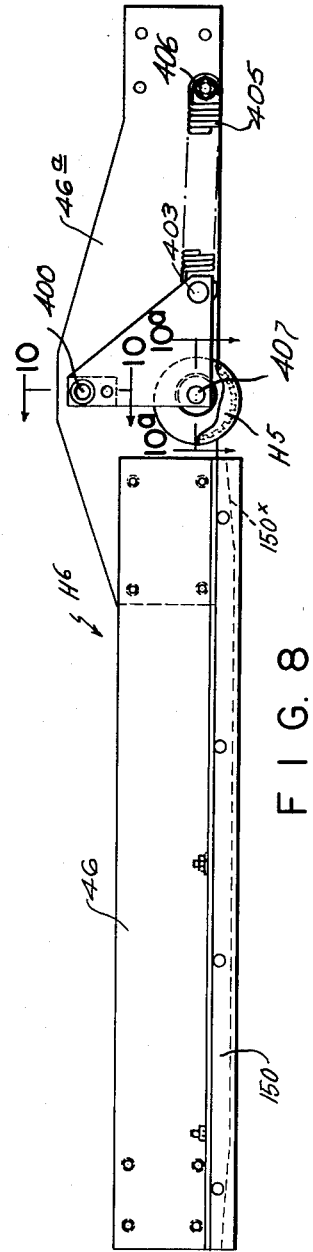
FIG. 8 is a rear elevation, to somewhat smaller scale than FIG. 4, showing the longitudinally extending frame which supports the shafts for the toothed pulleys or sprockets upon which the hold-down belt is mounted.
Figure 10:
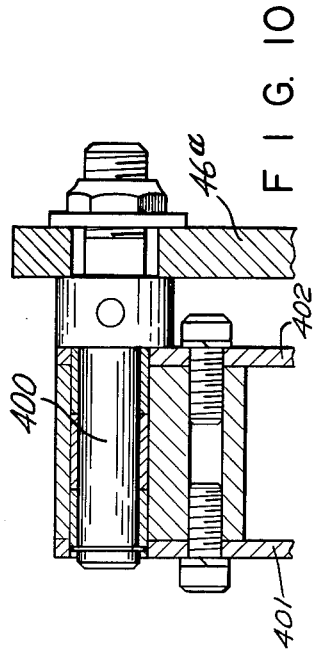
FIG. 10 is a fragmentary section on the line 10—10 of FIG. 8, to larger scale, showing the eccentric idler sprocket or pulley for the receiving end of the belt.
Figure 10A:
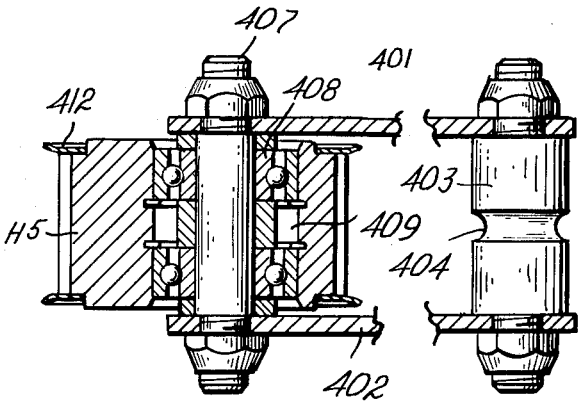
FIG. 10a is a horizontal section, to larger scale, on the line 10a—10a of FIG. 8.

As more clearly shown in FIGS. 8 and 9, the frame $H^6$ which supports the hold-down belt comprises two rigidly connected parts 46 and 46*a* respectively (FIGS. 8 and 9), the part 46*a* having projecting therefrom a rigid stub shaft 400 (FIG. 10) on which there is pivotally supported a swinging frame comprising the parallel rigid members 401 and 402 (FIGS. 10 and 10*a*). These members are connected by a pin 403 (FIG. 8) having a central groove 404 (FIG. 10*a*) in which is secured one end of a coiled tension spring 405 (FIG. 8) whose opposite end is fixed to a pin 406 projecting from the part 46*a*. The parts 401 and 402 of this swinging frame are also connected by a fixed shaft 407 (FIG. 10*a*) on which are fixed the inner races 408 of anti-friction bearings whose outer races are fixed in a bore 409 (FIGS. 10*a*, 11 and 12) in the idler or guide pulley or sprocket H5. As shown in FIGS. 11 and 12, this bore 409 is eccentric with reference to the center of the pitch circle of the sprocket; an eccentricity of approximately 0.170" providing the desired action. The peripheral surface of this pulley or sprocket has longitudinally extending grooves 411 and intervening teeth 410 (FIG. 11) for cooperation with the teeth at the inner side of the hold-down belt, so that there can be no slippage between the hold-down belt and the sprocket. Desirably, as shown in FIGS. 10*a* and 12, the sprocket is provided with side flanges 412 in order to keep the hold-down belt properly centered.

Figure 13:
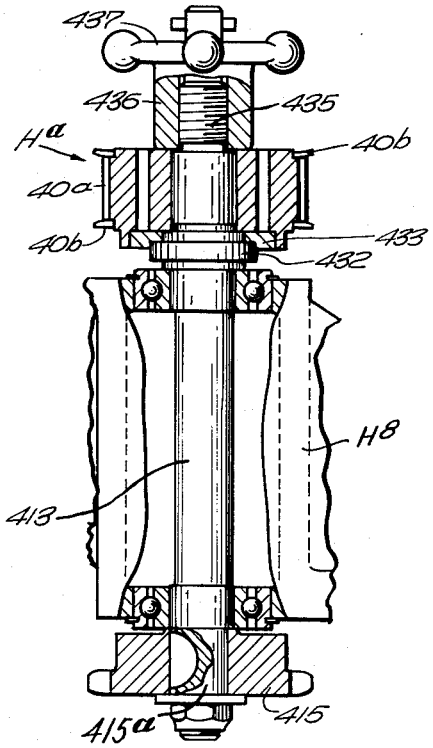
FIG. 13 is a section, to larger scale, on the line 13—13 of FIG. 4, showing the adjustable drive sprocket or pulley for the belt.
Figure 14:
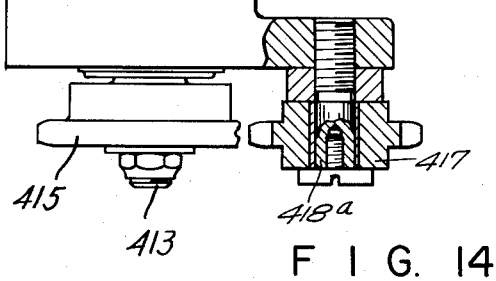
FIG. 14 is a fragmentary plan view, partly in horizontal section, on the line 14—14 of FIG. 4.

The drive pulley or sprocket H*a*, as shown in FIG. 13, is mounted upon a shaft 413 which turns in anti-friction bearings in the member $H^g$ (FIG. 4) which supports one end of the frame $H^6$. At its forward end a sprocket wheel 415 (FIG. 13) is keyed to the shaft 413 at 415*a* (FIG. 13), and this sprocket wheel 415 is engaged by an endless sprocket chain 416 (FIG. 5) which passes about an idler sprocket 417 which turns upon a stub shaft 418*a* (FIG. 14) fixed to the member $H^8$. From the sprockets 415 and 417, the chain 416 extends downwardly in parallel runs (FIG. 5) through a hollow housing 418 secured at its upper end to the member $H^8$ and which telescopes over a fixed vertical tubular standard 419 attached at its lower end to the upper surface of the table T.

Figure 7:
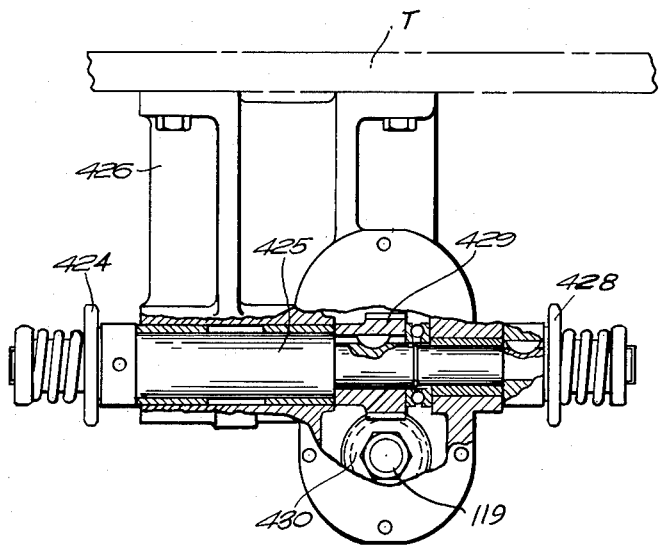
FIG. 7 is a section on the line 7—7 of FIG. 6 showing the shaft which transmits power from the main shaft to the conveyor and the hold-down belt.

Referring to FIG. 5, the endless chain 416 is shown as passing down through a hole in table T and about idler sprockets 420 and 421, the latter turning on a stub shaft fixed to an elongate link 423 arranged to rock about a fixed pivot shaft 423a. The chain then passes about a drive sprocket 424 fixed to a shaft 425 which turns in bearings (FIGS. 6 and 7) supported by a bracket 426 extending downwardly from the table T. At the opposite end of this shaft 425, there is fixed a sprocket 428 (having the same number of teeth as the sprocket 424) which drives the conveyor C. In the arrangement here shown the ratios of teeth in sprockets 424 and 415 is as 14:16, while the ratio of sprocket 415 to the belt sprocket Ha is as 16:20.

Fixed to the shaft 425 there is a helical gear 429 which meshes with a corresponding gear 430 on the main drive shaft 119 of the machine. After leaving the drive sprocket 424, the chain 416 passes about another idler sprocket 431 (FIG. 5), returning thence upwardly to the idler sprocket 417.

Rearwardly of the member $H^8$ (FIGS. 13 and 14), which supports the bearings for the drive shaft 413, the latter is provided (FIGS. 15 and 16) with a coaxial collar 432 (which may be integral with the shaft), having radial teeth in its periphery. The drive pulley or sprocket Ha has a coaxial ring 433 (FIGS. 16 and 17) at its inner or rear face having spaced recesses for engagement with the teeth in collar 432.

The pulley or sprocket Ha has spaced peripheral teeth 40b for engagement with the teeth of the hold-down belt and also has spaced guard flanges 40b. Rearwardly of the pulley or sprocket Ha, the shaft 413 has a peripheral screw-threaded portion 435 having threaded engagement with a bore in the tubular hub 436 (FIG. 16) of a hand wheel 437.

Referring to FIG. 16, the drive sprocket Ha is shown as clutched to the shaft 413 by engagement of the teeth of the toothed collar 432 on the shaft 413 with the internal teeth of the ring 433 which is fixed to the pulley or sprocket Ha—the parts thus being clamped together by the pressure of the internally screw-threaded hub 436 of the hand wheel 437—this hub having been advanced along the screw-threaded portion 435 of the shaft 413 by rotation of the hand wheel 437. In FIG. 17, the drive sprocket Ha is shown as disconnected from the shaft 413—the hub 436 of the hand wheel having been unscrewed from the shaft part 435 and the pulley or sprocket Ha having been pulled rearwardly until the teeth of the part 432 are disengaged from the teeth 433 of the sprocket. With the parts in this latter position, the hold-down belt may be moved in one direction or the other by hand without turning the drive shaft 413 and without disengaging the belt from the sprocket, so that the belt may be brought into accurately timed relation to the conveyor and spacing means.

Thus, by this means, it is possible to adjust the timing of the hold-down belt relatively to the conveyor and article-spacing means so as to assure the proper engagement of a down-going block $H^4$ of the hold-down belt with the top of a bottle as the latter is fed into the labeling zone by the star wheel—it being noted that, by reason of the eccentricity of the guide sprocket $H^5$ on its supporting shaft, the receiving end of the hold-down belt moves up and down periodically toward and from the conveyor. The timing is such, relatively to the spacing of the articles, that as a block $H^4$ of the belt passes from the upper belt run to the lower run, its article-contacting face will have become substantially horizontal before it moves down into contact with the top of a bottle.

Referring to FIGS. 18 and 19, the guide sprocket $H^5$ is shown as provided with two radial index lines $Z^1$ and $Z^2$ respectively, the line $Z^1$ indicating the point of maximum eccentricity. These lines are useful in adjusting the sprocket $H^5$ relatively to the drive shaft of the machine so that the belt may cooperate with bottles of various diameters. In this connection, it will be appreciated that when a bottle of relatively small diameter is to be handled, the vertical axis of the bottle need not have advanced so far, beyond the vertical plane of the axis of rotation of the shaft on which the eccentric sprocket is mounted, before maximum eccentricity of the sprocket pushes the belt down into contact with the top of the bottle, as when dealing with a bottle of larger diameter, since in the latter case the bottle must have advanced beyond the vertical center line of the shaft 407 a greater distance in order to insure that that portion of the belt which is moved vertically down by the eccentric sprocket will be horizontal across the entire diameter of the bottle top before the belt is forced down to its maximum extent by the eccentric sprocket. For example, as shown in FIG. 18, where a bottle Bs is being handled, the indicator line $Z^1$ is horizontal, indicating that the eccentric sprockets must make a three-fourths revolution before pushing the belt down to its lowest point. During this interval the bottle Bs will have advanced in the direction of the arrow $A^2$ (a distance dependent upon the speed of the conveyor), such that the the entire diameter of the bottle top will be beneath a horizontal part of the hold-down belt before contact is made. Referring now to FIG. 19, where the bottle Bb being handled is larger than the bottle Bs, the eccentric sprocket $H^5$ is shown with its maximum eccentricity $Z^1$ so positioned that the sprocket must turn through an angle of approximately 315° before the belt is forced down to its lowest position. This means that the bottle Bb will have traveled further than did the bottle Bs (beyond the center line $C^1$ and $C^2$ through the axis of the shaft 407), thus insuring that the entire diameter of the bottle top will be beneath the horizontal part of the hold-down belt before the latter contacts the top of the bottle. Thus, the tendency of the hold-down belt to tip the bottle as these parts come into engagement is substantially eliminated, and because the downward motion of the belt is accomplished by means of an eccentric action, troublesome vibrations are avoided.

The present apparatus not only provides for bringing the hold-down into contact with the bottle top with a minimum of danger of tipping the bottle, but at the same time it affords ready means for adjusting the timing of the belt with reference to that of the conveyor, as may become necessary when the frame $H^6$ is vertically adjusted, without requiring that the belt be disengaged from its sprockets, or that the weight of the belt be sustained by the operator while bringing the parts into proper correlation.

While one desirable embodiment of the invention has herein been described by way of example, it is to be understood that the invention is broadly inclusive of any and all modifications or equivalents falling within the terms of the appended claims.

I claim:

1. In combination, in a labeling machine which includes a conveyor operative to advance articles along a predetermined path, means operative to arrange articles in accurately spaced relation upon the conveyor, means for driving the conveyor at a predetermined accurate and uniform linear velocity, an endless hold-down belt comprising a toothed inner ply and a resiliently yieldable, article-engaging outer ply, a drive sprocket engaging the toothed inner ply, means for driving the sprocket, a guide sprocket engaging the toothed ply of the belt, said drive and guide sprockets defining upper and lower parallel runs of the belt, the major portion of the lower run being parallel to and moving in the same direction and at the same velocity as the conveyor and being above the conveyor at a distance such that when an article is interposed between the conveyor and the hold-down belt, the resiliently yieldable ply of the lower run of the hold-down belt will be compressed, the guide sprocket defining an arcuate run of the belt leading from the upper to the lower run of the latter, characterized in that the guide sprocket is of circular peripheral contour but turns about an eccentrically located axis, the axis about which the guide sprocket turns being so located and the rotation of the guide sprocket being so coordinated with the spacing of the articles on the conveyor that once, during each successive revolution, the guide sprocket forces that part of the belt which has just become a portion of the lower run thereof down, substantially vertically, into contact with the top of that article which is then directly beneath it on the conveyor.

2. A labeling machine according to claim 1, and wherein the belt-driving sprocket is mounted upon a power-driven shaft whose angular velocity is accurately related to the linear velocity of the conveyor, further characterized in having means releasably connecting the belt-driving sprocket to said shaft whereby the lower run of the belt may be shifted longitudinally, relatively to the conveyor, without removing the belt from the drive sprocket.

3. A labeling machine according to claim 1, and wherein the belt-driving sprocket is mounted upon a shaft which is driven at an angular velocity bearing a constant ratio to the linear velocity of the conveyor, further characterized in that said shaft has a part provided with spaced clutch elements and the belt-driving sprocket has complementary clutch elements, and wherein a manually-retractable part, having screw-threaded engagement with the shaft, normally holds the complemental clutch elements in operative engagement but which, when retracted, permits said clutch elements to be separated.

4. The combination according to claim 1, wherein the drive shaft for the drive sprocket is provided with a series of spaced clutch elements and the drive sprocket is provided with a complementary series of clutch elements, the drive sprocket being axially movable on the shaft thereby to engage or disengage said complemental clutch elements, further characterized in having clamping means operative to move the drive sprocket axially of the shaft to position said complementary clutch elements in engaging position but which is releasable to permit retraction of the drive sprocket so as to disengage said clutch elements.

5. A labeling machine of the kind which includes a conveyor operative to advance articles along a predetermined path, means operative to arrange articles in accurately spaced relation upon the conveyor, means for driving the conveyor at a predetermined accurate and uniform linear velocity, an endless hold-down belt comprising a toothed inner ply and an article-engaging outer ply, a drive sprocket engaging the toothed inner ply, means for driving the sprocket, a guide sprocket engaging the toothed ply of the belt, said drive and guide sprockets defining upper and lower elongate parallel runs of the belt, the major portion of the lower run being parallel to and moving at the same velocity and in the same direction as the conveyor and being above the conveyor at a distance such that when an article is interposed between the conveyor and the hold-down belt, the article-engaging ply of the lower run of the hold-down belt will contact the top of an article carried by the conveyor while the guide sprocket defines an arcuate run of the belt connecting said upper and lower runs, the drive and guide sprockets being carried by a frame which is vertically adjustable thereby to accommodate articles of different heights, the guide sprocket being of circular peripheral contour but turning about an eccentrically located axis, the axis about which the guide sprocket turns being so located and the rotation of the guide sprocket being so co-ordinated with the spacing of the articles on the conveyor that once, during each successive revolution, the guide sprocket forces that part of the belt which has just become a portion of the lower run thereof down substantially vertically into contact with the top of that article which is then directly beneath it on the conveyor, characterized in that to compensate for the slight angular rotation of the drive sprocket, incident to vertical adjustment of the frame, means is provided whereby the lower run of the hold-down belt may be slightly advanced or retarded manually without removing the belt from the drive sprocket.

References Cited by the Examiner
UNITED STATES PATENTS

| | | | |
|---|---|---|---|
| 900,578 | 10/08 | Nichols | 192—67 |
| 1,273,764 | 7/18 | Garrett | 192—67 |
| 2,561,765 | 7/51 | Wood | 192—53.6 |
| 3,115,232 | 12/63 | Carter | 156—493 |
| 3,142,374 | 7/64 | Carter | 198—165 |

SAMUEL F. COLEMAN, *Primary Examiner.*

EARL M. BERGERT, *Examiner.*